United States Patent

Furness

[11] Patent Number: 5,589,817
[45] Date of Patent: Dec. 31, 1996

[54] EARLY WARNING BRAKE LIGHT SYSTEM

[76] Inventor: Geoffrey M. Furness, 14 Fordyce Avenue, Auckland, New Zealand

[21] Appl. No.: 428,205

[22] PCT Filed: Nov. 11, 1993

[86] PCT No.: PCT/NZ93/00110

§ 371 Date: Jul. 12, 1995

§ 102(e) Date: Jul. 12, 1995

[87] PCT Pub. No.: WO94/11221

PCT Pub. Date: May 26, 1994

[30] Foreign Application Priority Data

Nov. 18, 1992 [NZ] New Zealand .............. 245165

[51] Int. Cl.$^6$ .................................. B60Q 1/50
[52] U.S. Cl. ............... 340/467; 340/466; 340/463; 340/464; 340/468; 340/479; 200/61.89
[58] Field of Search .................. 340/467, 466, 340/463, 464, 468, 479, 665, 666; 200/86.6, 61.29, 61.89; 310/311, 314; 73/DIG. 4

[56] References Cited

U.S. PATENT DOCUMENTS

| | | | |
|---|---|---|---|
| 3,911,394 | 10/1975 | Shames | 200/61.89 |
| 3,912,892 | 10/1975 | Morehouse | 200/61.89 |
| 3,921,750 | 11/1975 | Shames | 200/61.89 |
| 4,034,338 | 7/1977 | Bevilacqua | 340/463 |
| 4,275,378 | 6/1981 | Henderson | 200/61.45 R |
| 4,357,594 | 11/1982 | Ehrlich et al. | 340/467 |
| 4,788,526 | 11/1988 | Eckstein et al. | 340/467 |
| 4,894,652 | 1/1990 | Eckstein et al. | 340/467 |
| 4,916,431 | 4/1990 | Gearey | 340/464 |
| 5,387,898 | 2/1995 | Yeheskel et al. | 340/467 |

FOREIGN PATENT DOCUMENTS

| | | |
|---|---|---|
| 64272/86 | 4/1987 | Australia . |
| 1265593 | 2/1990 | Canada . |
| 0219858 | 4/1987 | European Pat. Off. . |
| 0360167 | 3/1990 | European Pat. Off. . |
| 0501555 | 9/1992 | European Pat. Off. . |
| 2225007 | 10/1974 | France . |
| 2597810 | 10/1987 | France . |
| 3240527 | 5/1984 | Germany . |
| 4022856 | 12/1990 | Germany . |

Primary Examiner—Donnie L. Crosland
Attorney, Agent, or Firm—Jacobson, Price, Holman & Stern, PLLC

[57] ABSTRACT

Apparatus for the monitoring of the accelerator pedal in order to provide an early warning braking system and/or method therefor. The apparatus uses a detection mechanism to generate a signal representative of the pressure or force applied to the accelerator of the vehicle and utilizes a monitoring mechanism to monitor the signals provided by the detection mechanism. Also present are comparison and calculation devices to compare the monitored signals from the monitoring mechanism and to calculate the rate of change of pressure or force applied to the accelerator. There is a second comparison device to compare the rate of change in pressure or force on the accelerator with a pre-set limit signalling device operatively connected to the comparison device such that the signalling device is activated when the rate of change of pressure or force applied to the accelerator is above or alternatively below the pre-set limit. A variety of other comparisons are provided including at least one to filter out the effects of gear changes.

22 Claims, 6 Drawing Sheets

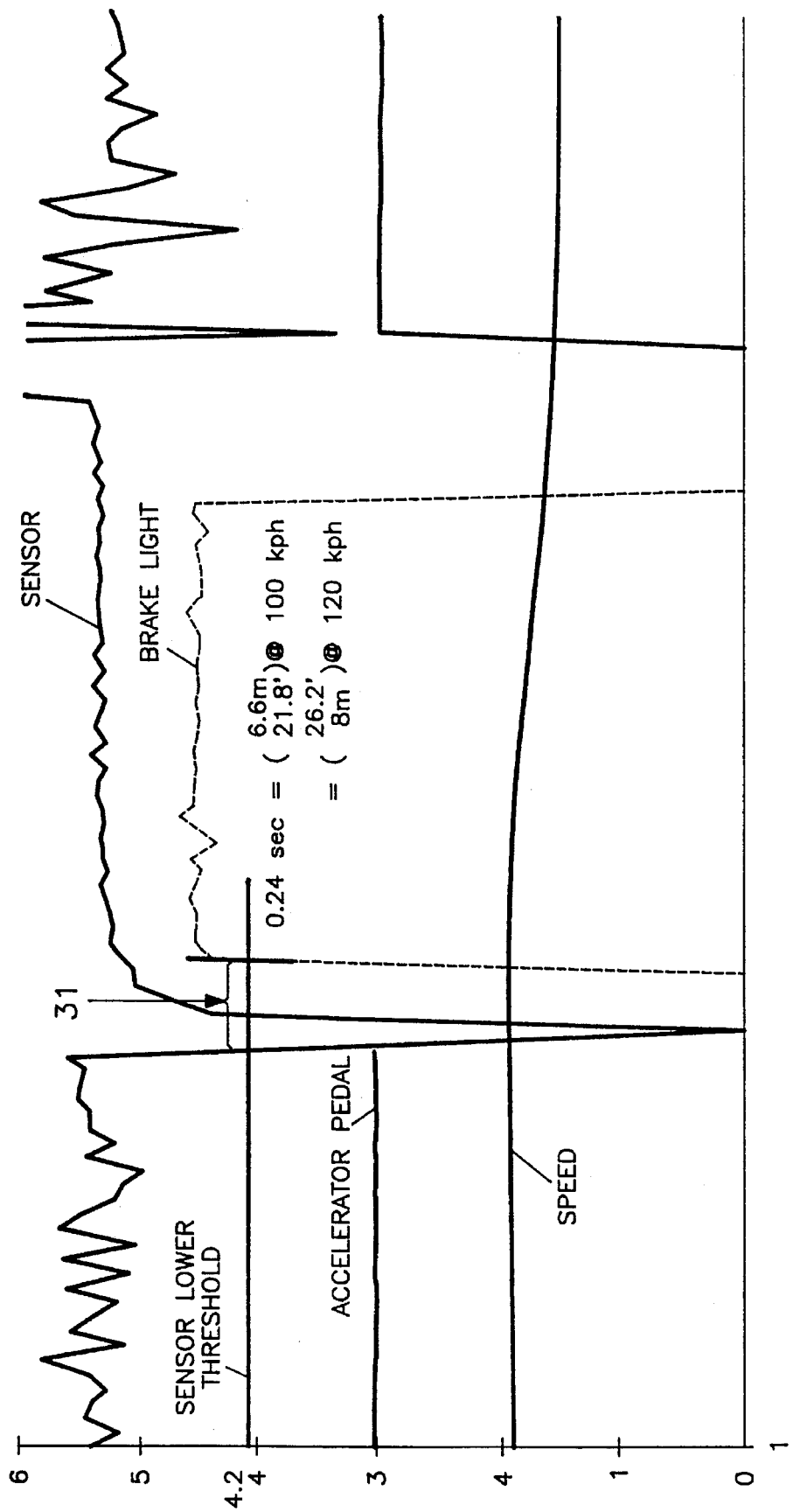

EARLY WARNING BRAKE LIGHT SYSTEM

TECHNICAL FIELD

This invention relates to apparatus for the monitoring of the accelerator pedal for early warning braking systems and/or methods therefor.

BACKGROUND ART

In the past a number of inventions have been directed to a variety of systems to provide an early warning braking signal. Of these, a number have been directed towards apparatus attached to the accelerator rather than the conventional switch triggered by the brake pedal so that the signal will be even upon, for example, release of the accelerator pedal rather than on the positive actuation of the brake pedal. This potentially provides a slightly, yet distance-travelled-wise significantly earlier signal over the conventional system where a foot is moved from the accelerator pedal onto the brake pedal.

Early braking signals reliant on a light actuation circuit parallel to the normal brake switched brake light signal circuit which are actuated from a sensor on or involved with the accelerator pedal so as to provide an advance warning of imminent braking has been disclosed in a number of published patent specifications. Examples include U.S. Pat. Nos. 3,911,394, 3,912,892, 3,921,750, 4,034,338, 4,788,526, 4,894,652; Canadian Patent Specification No. 1265593; French Patent Specification No. 2225007 and 2597810; European Patent Specification No. 219858; Australian Patent Specification No. 8664272 and German Patent Specification Nos. 3240527 and 4022856.

Many of the patent specifications aforesaid as well as the twenty two patent specifications cited against U.S. Pat. No. 4,788,526 disclose an advance warning system instead of and/or in addition to the normal brake light signalling system. Many require foot movement or foot removal from the accelerator so as to actuate an electrically or mechanically operated switching mechanism. Some relate to all braking.

A feature of many of the prior art systems referred to in any of the aforementioned patent specifications (the full content of which are hereby herein corporated by way of reference) are unsuitable for non-automatic gear changes in motor vehicles or else are so restricted in their operation as to provide advance warning for very sudden stopping only.

U.S. Pat. Nos. 4,788,526 and 4,894,652 (Eckstein and Shapira) discloses an interesting prior art advance braking warning system. That of U.S. Pat. No. 4,788,526 relies on a bellows type sensor mounted on the accelerator pedal which, during normal driving, is pressed down to a minimum volume but which, upon abrupt release, develops a sub-pressure which is used to switch a parallel brake light circuit to that normally operated by the brake pedal itself and the lights so actuated remain on until the light circuit is taken over by the brake pedal switching circuit. An alternative disclosed is a magnetic coil surrounded by an induction coil. Such a system, however, has certain disadvantages including the fact that it is appropriate for sudden braking only particularly with non-automatic gear shift vehicles and it does require a significant foot movement in order to operate the switching mechanism.

The subsequently developed embodiment of Eckstein and Shapira disclosed in U.S. Pat. No. 4,894,652 retains the bellows type mechanical actuation of a switching mechanism or the alternative of a magnetic coil surrounded by an induction coil. Again, such a system requires a significant foot movement and is inappropriate for other than automatic gear shift vehicles unless it is restricted to very sudden stopping indeed. An embodiment of the invention disclosed therein requires a switch 41 to cater for gear changes thereby removing any benefits that might have accrued from the use of the bellows which, unlike many other sensor systems on accelerators, is not dependent on a foot removal from the accelerator but rather on the change in the pressure being applied on the accelerator.

Nevertheless, all such systems have no application in a situation where manual gear shifts, which are the predominant types of gear shift used in New Zealand, are to be used and/or where the parallel system for brake signalling is to be used other than for sudden stop.

DISCLOSURE OF INVENTION

It is an object of the present invention to overcome some of these disadvantages of the prior art and/or at least provide the public with a useful choice.

Accordingly, in a first aspect the invention consists in signalling apparatus for motor vehicles comprising:

detection means to generate a signal representative of the pressure or force applied to the accelerator of the vehicle;

monitoring means to monitor the signals provided by the detection means;

comparison and calculation means to compare the monitored signals from the monitoring means and calculate the rate of change of pressure or force applied to the accelerator;

a second comparison means to compare the rate of change in pressure or force on the accelerator with a pre-set limit; and signalling means operatively connected to said second comparison means such that said signalling means is activated when the rate of change of pressure or force applied to the accelerator is above, or alternatively below, the pre-determined limit.

Preferably, said pressure detection means comprises a dynamic pressure transducer mounted under the driver's foot on the top of the accelerator pedal.

Preferably, said monitoring means, first comparison means and calculation means are provided by a microprocessor.

Preferably, said apparatus includes adjustment means to adjust said pre-determined limit.

Alternatively, said apparatus includes adjustment means to adjust a sample rate or a number of clock cycles between samples in said monitoring means.

Preferably, said signalling means comprise a brake warning light activated when the rate of decrease in pressure is greater than a pre-set limit.

Alternatively, said signalling means comprise a fuel efficiency signal and the apparatus may then include further calculation means to integrate counts of both increasing and/or decreasing rates of change of accelerator pressure and compare these against pre-determined limits to provide an indication of fuel efficiency.

Accordingly, in a second aspect, the invention consists in a method of operating a signal warning device in a motor vehicle comprising:

measuring the rate of change in pressure or force applied to the accelerator;

comparing the rate of change of pressure or force applied to the accelerator against a pre-determined limit; and activating said signalling means when said rate of change of pressure is above, or alternatively below, said pre-set limit.

In a third aspect the invention consists in a method of operating a warning signal indicative or reasonably indicative of a vehicle about to be braked or severely decelerated, said method comprising:

(I) generating an electrical signal indicative of the rate of change in the pressure or force (hereafter "foot pressure signal") being applied to the accelerator of the vehicle;

(II) generating an electrical signal indicative of the speed of the vehicle (hereafter "speed signal");

(III) comparing, in a monitoring circuit receiving said foot pressure signal, negative values (ie. those of a rate of decrease of pressure) of said foot pressure signal against a threshold level to provide a determination of whether or not there is likely to be a panic stop or not;

(IV) if the comparison of step (III) provides no determination of there being a likely panic stop, in a circuit receiving said foot pressure signals and said speed signals, (a) comparing negative values of foot pressure signal against an alternative threshold level to provide a determination of whether severe braking is likely to occur (but less severe as to be indicative of a panic stop)

and (b) optionally, determining the vehicle is travelling in excess of a speed threshold and (c) optionally, determining the immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and (V) providing at least for a brief period of time an electrical current actuation of said warning signal whenever there is either:

(a) determination by step (III) of there likely being a panic stop or (b) there is a determination by step (IV) by satisfying condition (a) and any one or more of optional conditions (b), (c) and (d) of there likely being severe braking (but less severe as to be indicative of a panic stop).

Preferably step (IV) includes step (c) and there is a (IV)(c) determination that does not reject a step (IV) actuation on account of a likely gear change prior to said electrical current actuation of said warning signal.

Preferably there is a (IV)(b) determination of vehicle speed being over a speed threshold prior to there being said electrical current actuation of said warning signal.

Preferably step (IV) includes step (d) and there is a determination by (IV)(d) that does not reject a step (IV) actuation on account of bounce prior to said electrical current actuation of said warning signal.

Preferably the circuit of step (IV) is associated with or includes logic means and the threshold for such values of negative foot pressure signals and/or acceleration threshold is changed by the logic means dependent at least to some extent on inputs thereinto of instances where the existing (IV)(c) threshold has not rejected severe braking but no braking using the brake pedal subsequently ensued related to the severe braking, and vice versa, such changing of the threshold being to better recognise the driving (eg. gear changing) habits of a current driver.

Preferably said generating and electrical signal of step (I) is by means of a piezoelectric transducer which provides an analogue signal function.

Preferably the provision by step (V) of an electrical current actuation of said warning signal is timer controlled, ie. if some alternative or parallel electrical current actuation is not provided within said at least brief period of time, it does not continue after said at least brief period of time to provide any electrical current actuation of said warning signal.

Preferably said providing at least for a brief period of time an electrical current actuation of said warning signal is in parallel to any electrical current actuation of a said warning signal by a brake actuated switch.

Preferably said warning signal is at least one brake light.

In a fourth aspect the invention consists in apparatus for performing a method of operating a warning signal indicative or reasonably indicative of a vehicle about to be braked or severely decelerated, said method comprising:

(I) generating an electrical signal indicative of the rate of change in the pressure or force (hereafter "foot pressure signal") being applied to the accelerator of the vehicle;

(II) generating an electrical signal indicative of the speed of the vehicle (hereafter "speed signal");

(III) comparing, in a monitoring circuit receiving said foot pressure signal, negative values (ie. those of a rate of decrease of pressure) of said foot pressure signal against a threshold level to provide a determination of whether or not there is likely to be a panic stop or not;

(IV) if the comparison of step (III) provides no determination of there being a likely panic stop, in a circuit receiving said foot pressure signals and said speed signals, (a) comparing negative values of foot pressure signal against an alternative threshold level to provide a determination of whether severe braking is likely to occur (but less severe as to be indicative of a panic stop)

and (b) optionally, determining the vehicle is travelling in excess of a speed threshold and (c) optionally, determining the immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced induced as the result of such immediately preceding positive foot pressure signals, and (V) providing at least for a brief period of time an electrical current actuation of said warning signal whenever there is either:

(a) determination by step (III) of there likely being a panic stop or (b) there is a determination by step (IV) by satisfying condition (a) and any one or more of optional conditions (b), (c) and (d) of there likely being severe braking (but less severe as to be indicative of a panic stop), said apparatus comprising:

(i) means to generate an electrical signal indicative of the rate of change in the pressure or force (hereafter "foot pressure signal") being applied to the accelerator of the vehicle;

(ii) means to provide an electrical signal indicative of the speed of the vehicle (hereafter "speed signal");

(iii) means to provide a monitoring circuit to receive said foot pressure signal and to compare negative values (ie. those of a rate of decrease of pressure) of said foot pressure signal against a threshold level to provide a determination of whether or not there is likely to be a panic stop or not;

(iv) means to receive said foot pressure signals and said speed signals at least if the comparison of step (III) of the method provides no determination of there being a likely panic stop; and (a) to compare negative values of foot pressure signal against an alternative threshold level to provide a determination of whether severe braking is likely to occur (but less severe as to be indicative of a panic stop); and (b) optionally to determine the vehicle is travelling in excess of a speed threshold: and (c) optionally to determine immediately preceding values of acceleration of the vehicle (determined over a period) are below a threshold for such values as would indicate that negative foot pressure signals are likely the result of foot movements associated with a gear change; and (d) optionally to determine immediately preceding values of positive foot pressure signals (determined over a preceding period—whether the same or different to that of (IV)(c)) are below a threshold for such signals as would indicate that negative foot pressure signals are likely bounce-induced as a result of such immediately preceding positive foot pressure signals; and (v) means providing at least for a brief period of time an electrical current actuation of a warning signal whenever there is either (a) determination by step (III) of the method that there is likely being a panic stop or (b) there is a determination by step (IV) of the method by satisfying condition (a) and at least one or more of the optional conditions (b), (c) and (d) of the method of there likely being severe braking (but less severe as to be indicative of a brake panic stop).

Preferably said means to receive said foot pressure signals and said speed signals at least if the comparison of step (III) of the method provides no determination of there being a likely panic stop includes means whereby the determination of step (III)(c) is included in said means such that a (IV)(c) determination that does not reject a step (IV) actuation on account of a likely gear change prior to said electrical current actuation of said warning signal can be performed.

Preferably said means to receive said foot pressure signals and said speed signals at least if the comparison of step (III) of the method provides no determination of there being a likely panic stop includes means whereby there is a (IV)(b) determination of vehicle speed being over a speed threshold prior to there being said electrical current actuation of said warning signal.

Preferably said means to receive said foot pressure signals and said speed signals at least if the comparison of step (III) of the method provides no determination of there being a likely panic stop includes means in the circuit thereof whereby logic means controls the threshold for the values of the step (c) determination referred to in Claim 12 and/or the threshold for negative foot pressure signals, whereby the threshold for such values is changed by the logic means dependent at least to some extent on inputs thereinto of instances where the existing (IV)(c) threshold has not rejected severe braking but no braking using the brake pedal subsequently ensued related to the severe braking determination by step (IV)(c), and vice versa (such changing of the threshold being to better recognise the driving (eg. gear changing) habits of a current driver.

Preferably step (IV) includes step (d) and there is a determination by (IV)(d) that does not reject a step (IV) actuation on account of bounce prior to said electrical current actuation of said warning signal.

Preferably said generating and electrical signal of step (I) is by means of a piezoelectric transducer which provides an analogue signal to the monitoring circuits(s).

Preferably the provision by step (V) of an electrical current actuation of said warning signal is timer controlled, ie. if some alternative or parallel electrical current actuation is not provided within said at least brief period of time, it does not continue after said at least brief period of time to provide any electrical current actuation of said warning signal.

In a fifth aspect the invention consists in a method of operating a warning signal indicative or reasonably indicative of a vehicle about to be braked or severely decelerated, said method comprising:

(i) generating with a piezoelectric transducer an electrical signal indicative of the rate of change in the pressure or force (hereafter "foot pressure signal") being applied to the accelerator of the vehicle;

(ii) generating an electrical signal indicative of the speed of the vehicle (hereafter "speed signal");

(iii) comparing, in a monitoring circuit receiving said foot pressure signal, negative values (ie. those of a rate of decrease of pressure) of said foot pressure signal against a threshold level to provide a determination of whether or not there is likely to be a panic stop or not;

(iv) if the comparison of step (iii) provides a determination of there being a likely panic stop providing at least for a brief period of time an electrical current actuation of said warning signal.

Preferably said provision at least for a brief period of time of an electrical current actuation of said warning signal is to a brake light and is in parallel to the conventional brake pedal actuation thereof.

Preferably (iv) if the comparison of step (iii) provides no determination of there being a likely panic stop, in a circuit receiving said foot pressure signals and said speed signals, (a) comparing negative values of foot pressure signal against an alternative threshold level to provide a determination of whether severe braking is likely to occur (but less severe as to be indicative of a panic stop), and (b) optionally, determining the vehicle is travelling in excess of a speed threshold and (c) optionally, determining the immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and wherein even where there is no determination of step (iii) of there likely being a panic stop, providing at least for a brief period of time an electrical current actuation of said warning signal whenever there is a determination by step (iv) by satisfying condition (a) and any one or more of optional conditions (b), (c) and (d) of there likely being severe braking (but less severe as to be indicative of a panic stop).

Preferably said provision of the electrical current actuation of step (iv) is in parallel to that which would be provided to the warning signal by a conventional brake pedal (eg. to the brake lights).

In a sixth aspect the invention consists in apparatus for performing a method of operating a warning signal indicative or reasonably indicative of a vehicle about to be braked or severely decelerated, said method comprising:

(i) generating with a piezoelectric transducer an electrical signal indicative of the rate of change in the pressure or force (hereafter "foot pressure signal") being applied to the accelerator of the vehicle;

(ii) generating an electrical signal indicative of the speed of the vehicle (hereafter "speed signal");

(iii) comparing, in a monitoring circuit receiving said foot pressure signal, negative values (ie. those of a rate of decrease of pressure) of said foot pressure signal against a threshold level to provide a determination of whether or not there is likely to be a panic stop or not;

(iv) if the comparison of step (iii) provides a determination of there being a likely panic stop providing at least for a brief period of time an electrical current actuation of said warning signal, said apparatus comprising:

(i) means for generating with a piezoelectric transducer an electrical signal indicative of the range of change in the pressure or force (hereafter "foot pressure signal") being applied to the accelerator of the vehicle;

(ii) means for generating an electrical signal indicative of the speed of the vehicle (hereafter "speed signal");

(iii) means for comparing, in a monitoring circuit receiving said foot pressure signal, negative values (ie. those of a rate of decrease of pressure) of said foot pressure signal against a threshold level to provide a determination of whether or not there is likely to be a panic stop or not;

(iv) means which if the comparison in the monitoring circuit provides a determination of there being a likely panic stop providing at least for a brief period of time an electrical current actuation of said warning device.

Preferably means is provided for performing the following extension of the method, namely:

(iv) if the comparison of step (iii) provides no determination of there being a likely panic stop, in a circuit receiving said foot pressure signals and said speed signals, (a) comparing negative values of foot pressure signal against an alternative threshold level to provide a determination of whether severe braking is likely to occur (but less severe as to be indicative of a panic stop), and (b) optionally, determining the vehicle is travelling in excess of a speed threshold and (c) optionally, determining the immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and wherein even where there is no determination of step (iii) of there likely being a panic stop, providing at least for a brief period of time an electrical current actuation of said warning signal whenever there is a determination by step (iv) by satisfying condition (a) and any one or more of optional conditions (b), (c) and (d) of there likely being severe braking (but less severe as to be indicative of a panic stop), the apparatus being further characterised in that it provides means in or associated with said monitoring circuit for performing said method.

Preferably when operatively installed in a motor vehicle and the warning signal device is a brake light or lights to be operated in addition to or in parallel to the normal brake light signals of the motor vehicle.

In a further aspect the invention consists in a method as hereinbefore described for operating a warning signal indicative or reasonably indicative of a vehicle about to be braked or severely decelerated when performed substantially as hereinbefore described with or without reference to any of the accompanying drawings.

In a still further aspect the invention consists in apparatus for operating a warning signal indicative or reasonably indicative of a vehicle about to be braked or severely decelerated substantially as hereinbefore described with or without reference to any of the accompanying drawings.

BRIEF DESCRIPTION OF DRAWINGS

The invention consists in the foregoing and also envisages constructions of which the following gives examples.

This invention will now be described with reference to the following drawing:

FIG. 6 gives an enlarged plot of various parameters during use of a preferred form of the present invention.

BEST MODES FOR CARRYING OUT THE INVENTION

Figure 1:
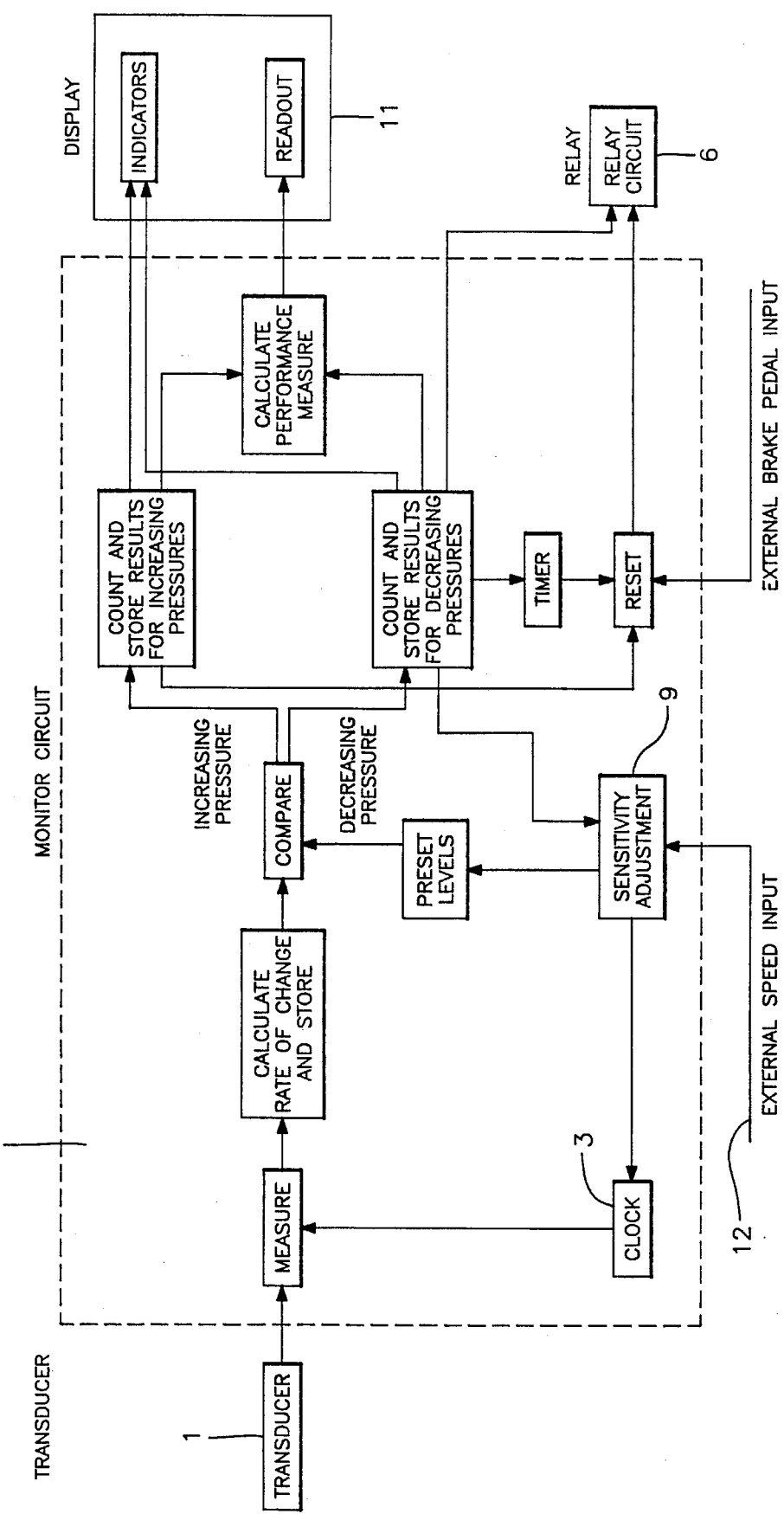
FIG. 1 is a block diagram of an electronic circuit in accordance with one embodiment of the invention.

This invention includes a provision of detection means 1 to produce a signal representative of the pressure of force applied to the accelerator of a vehicle. This detection means 1 may be a dynamic pressure transducer mounted on the top of the accelerator pedal on or about the expected position of a drivers foot. A variety of different types of apparatus may be used to produce such a signal such as strain gauges, piezoelectric devices, a conductive foam material photoelectric device or other means such that the means generates an electrically measurable output as a function of the pressure or force applied to the accelerator.

Preferably, the transducer 1 will have a very high dynamic response rate and generate signals for both increasing and decreasing changes of pressure of force without requiring any physical movement of the accelerator pedal or accelerator to throttle linkage.

The signal produced by the detection means may then be provided to monitoring means and comparison and calculation means 2. It is preferred that this is provided by a microprocessor or other electronic circuitry to monitor the signals generated by the detector, calculate the rate of change of pressure or force applied to the accelerator and compare this against a pre-set level.

The microprocessor or electronic circuitry to perform this monitoring function may include a clock circuit 3 to sample the signal produced by the detector 1 at a specific frequency. Furthermore, this frequency may be adjustable to adjust the sensitivity of the apparatus.

The microprocessor or electronic circuitry comprising the monitoring calculation and comparison means will generate an output signal if the rate of change of pressure calculated over one or more clock cycles exceeds a pre-set limit over the designated number of clock cycles. This output signal can then be used to activate the signaling means such as a brake light or perhaps by a relay 6.

A greater rate of decrease in pressure than the pre-set limit will activate, preferably, the existing vehicle stop lights through apparatus such as a relay 6 in parallel with the vehicles existing electrical circuitry. This will allow the apparatus to operate without interfering with the existing vehicle stop lights should a fault occur.

Alternatively, the signalling apparatus could comprise a separate braking signal or an alternative actuation of the existing brake light such as a flashing signal until the brake pedal switching gear is also operated.

The sensitivity of the device may be adjusted by adjustment means 9 to vary any one or all of the predetermined limits, sample rate or number of clock cycles between samples, or number of consecutive samples exceeding preset limits.

The signalling apparatus such as brake lights may, preferably, be reset under any of a number of different actuations. The stop light may be deactivated by an increase in pressure on the accelerator or, an increase above a further predetermined limit. Alternatively or additionally, there may be an upper time limit set for the further actuation by the brake pedal circuitry. It may be preferable that any brake light actuation from the brake pedal circuitry deactivates the signal from the accelerator apparatus.

In a further form of the invention, the detection monitoring calculation and comparison means can be used to provide a signal representative of fuel economy or a driving technique efficiency measure. In this case, the apparatus can be used to signal either a greater rate of increase in pressure than a predetermined limit and thereby signal heavy acceleration or the apparatus may integrate counts of both increasing and/or decreasing rates of change for accelerator pressure above predetermined limits from a pre-set initial starting time or distance to the current time or distance covered to give a read out of driver performance.

This signalling apparatus may comprise a dashboard mounted unit 11 indicating heavy acceleration and/or frequent variations in acceleration which relate to increased fuel consumption. For ideal fuel efficiency, the manipulation of the accelerator pedal should be gentle and avoiding harsh acceleration and deceleration to the greatest possible extent.

In this form, the apparatus may include a variety of settings on the device so that the device may count decreasing accelerator movements, increasing accelerator movements to provide a measure of driver performance. A reset button to reset the time period over which the driver performance is calculated or other variations to provide further information useful to the driver which is a function of the accelerator pedal actuation.

In a preferred form of the invention, both different types of apparatus would be incorporated in a single device with two different signalling means, one signalling means for the early warning of vehicle braking and the second for the fuel economy.

The apparatus preferably includes a vehicle speed input 12 taken from the existing vehicle speedometer or through separate apparatus which may be used to increase or decrease the sensitivity of the apparatus at high speeds or low speeds or even deactivate the device under certain conditions such as very slow speed in heavy traffic.

Also, the apparatus preferably is automatically self-adjusting if the number of activations by the device is greater than a pre-set limit of activations per set number of clock cycles. It may also include an automatic adjustment if the number of activations of the apparatus not followed by actual brake activation or the number of brake applications not preceded by an apparatus activation is too high. This may be only a temporary adjustment or permanent.

Figure 2:
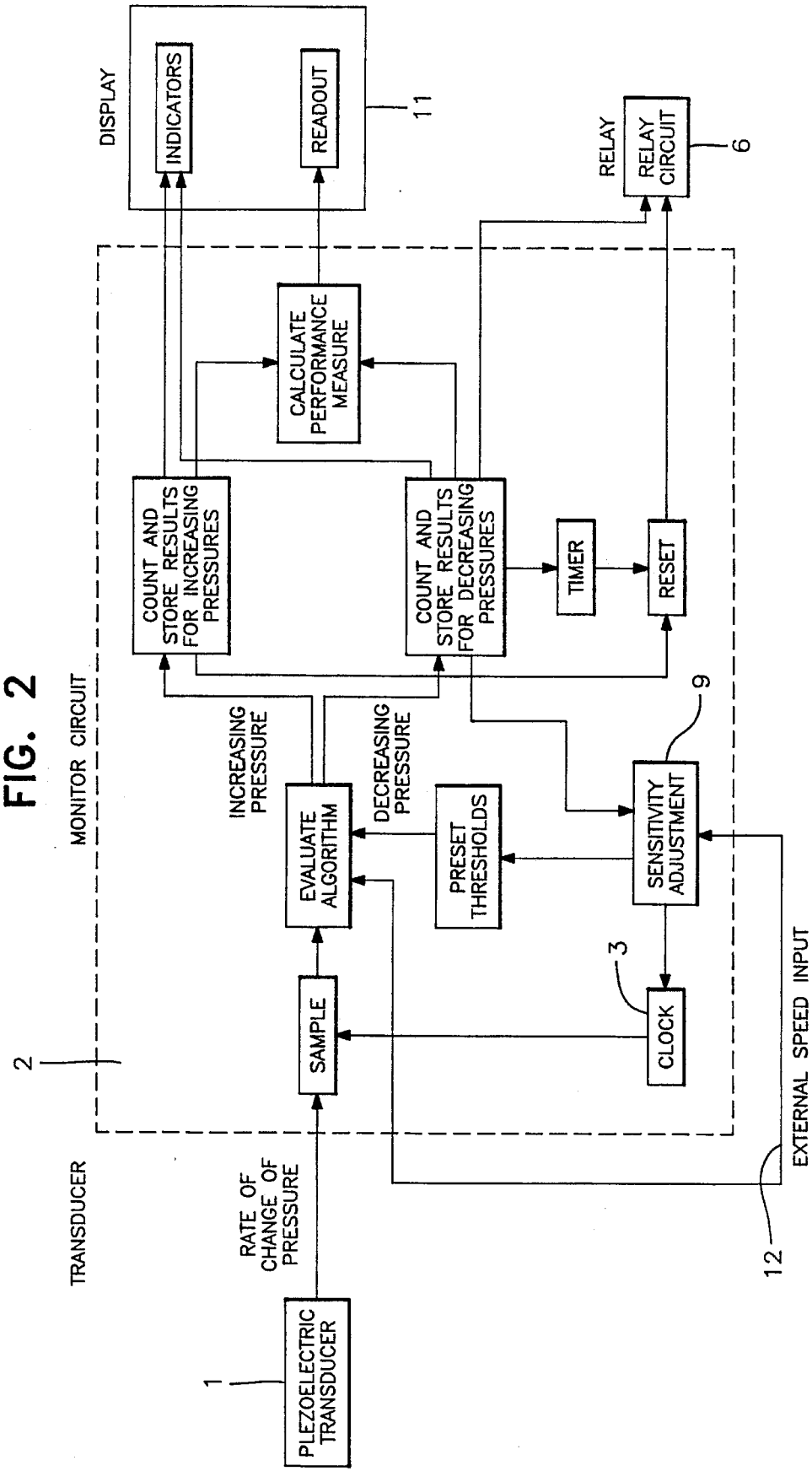
FIG. 2 is a similar block diagram to that of FIG. 1, but showing a transducer/monitor circuit interface whereby the function of the transducer measure and calculation of the rate of change is all effected by means of the piezoelectric transducer and that box previously concerned with a bare comparison is replaced by one which evaluates an algorithm as hereinafter described.
Figure 3:
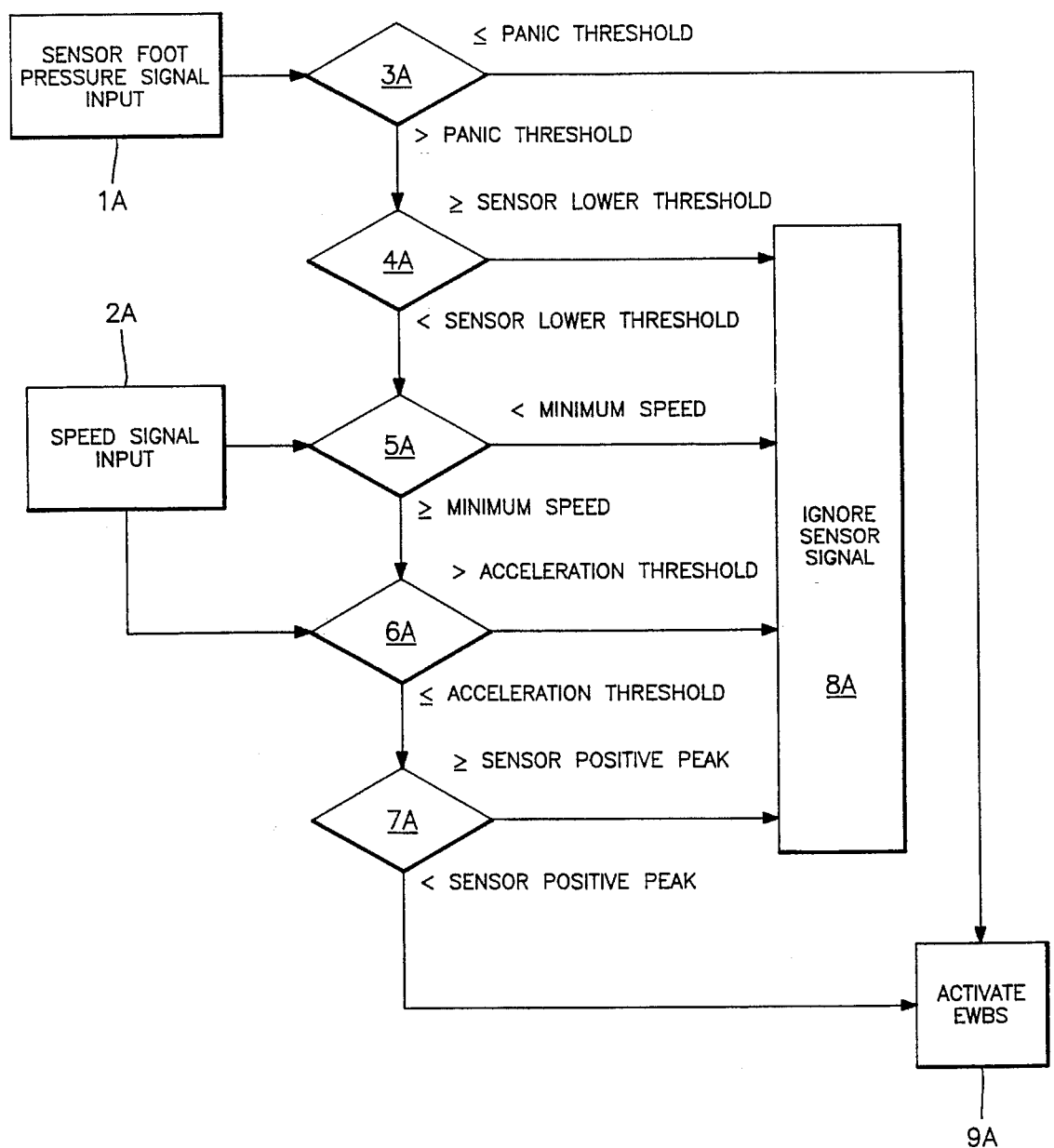
FIG. 3 is a flow diagram of the filtering algorithm used in at least a preferred form of the present invention to provide activation of the early warning braking system in other than panic braking situations.
Figure 4:
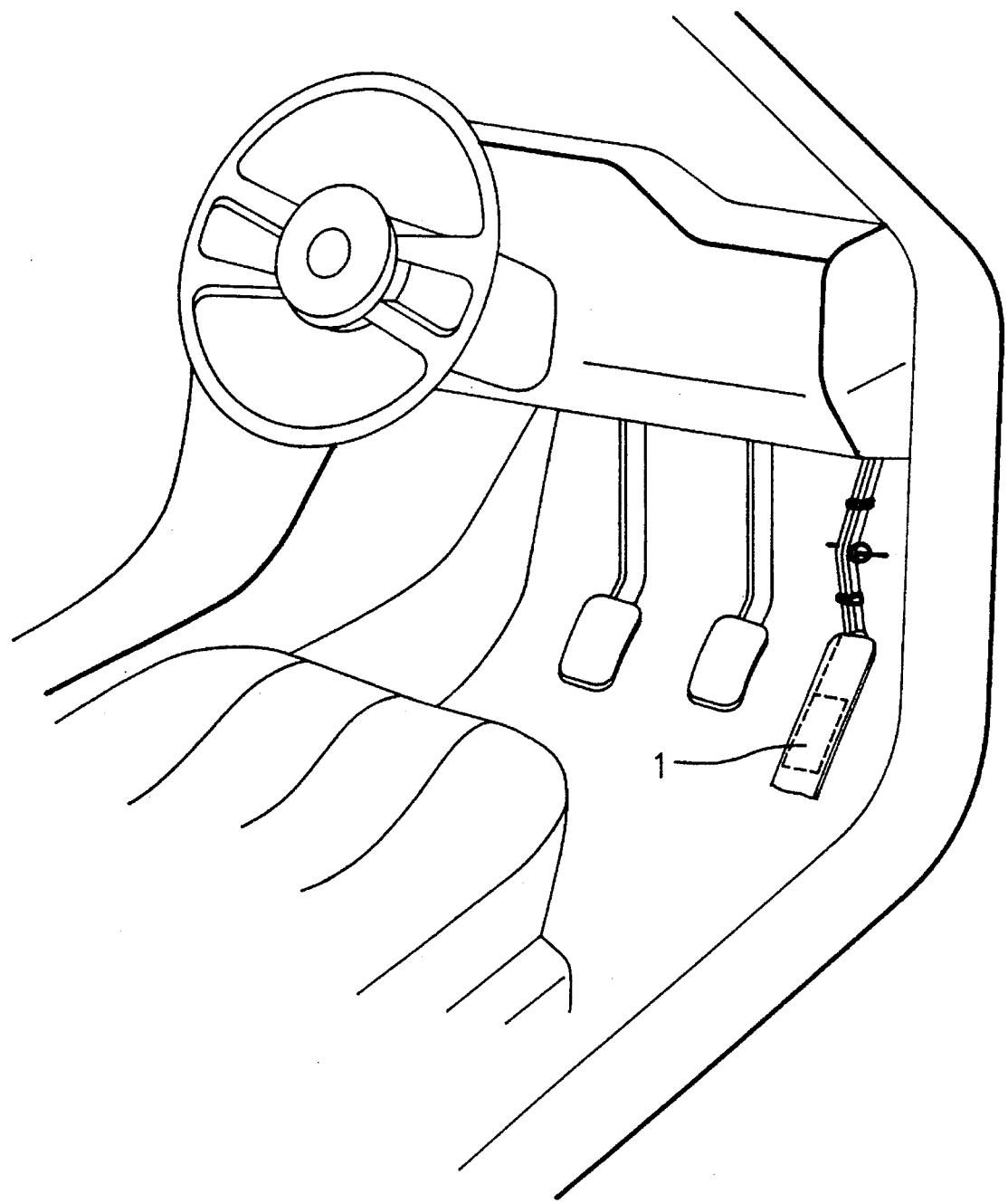
FIG. 4 is a partial perspective view showing the positioning of the detection means upon the accelerator pedal of a vehicle.
Figure 5:
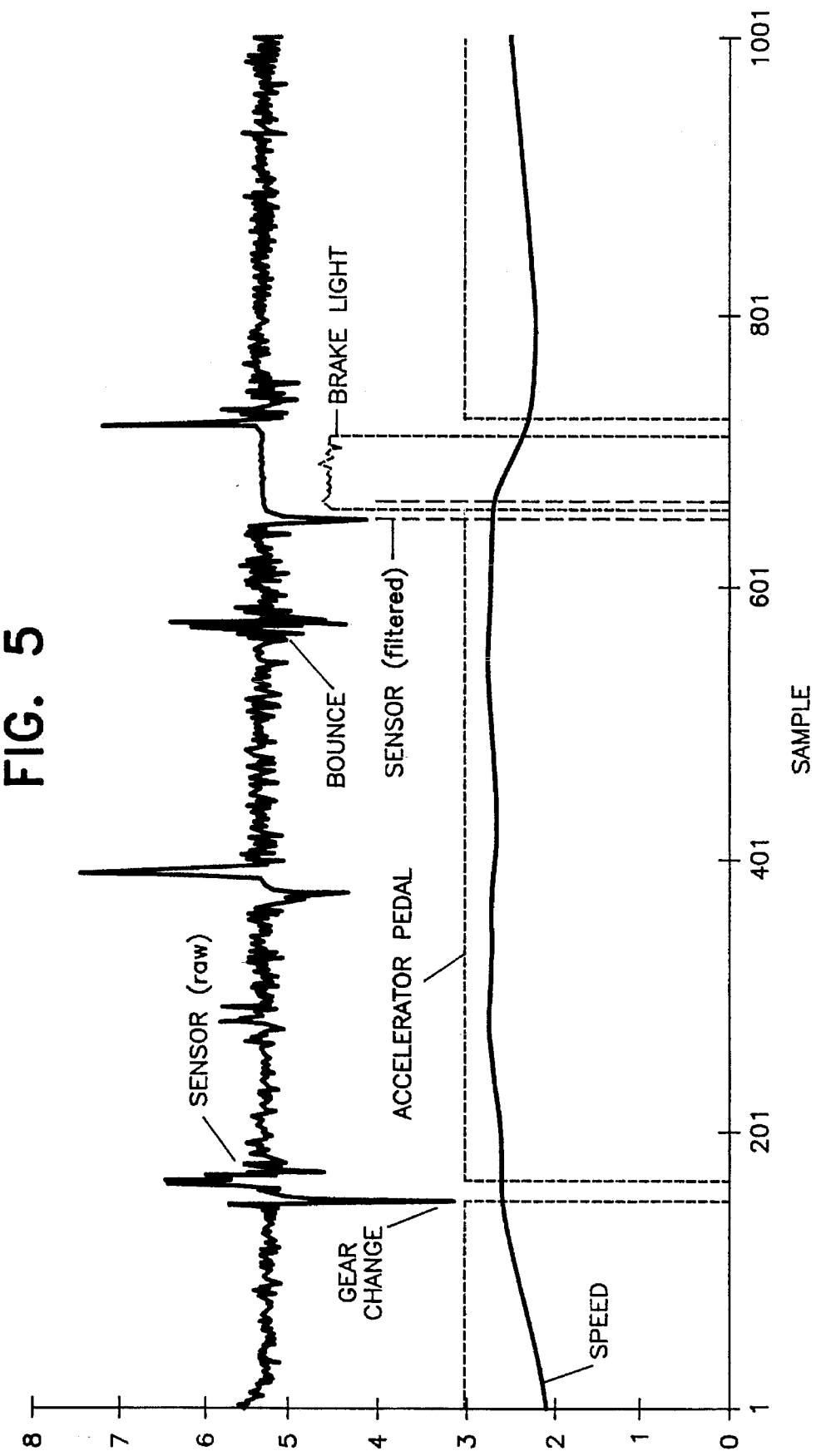
FIG. 5 gives a plot of the values of various parameters obtained during the use of one form of the present invention.

The preferred apparatus that is depicted in FIG. 2 where the reset is purely by virtue of a timer and the input from the accelerator pedal of the motor vehicle is preferably from a piezoelectric transducer fabricated from, for example, piezoelectric cable available from Radio Spares Components Limited, 12 Saunders Place, Auckland, New Zealand.

The algorithm to be used as a filter of the raw transducer input also requires a speed input. The piezoelectric sensor on the accelerator pedal produces an analogue signal whose amplitude is proportional to the rate of change of pressure on the accelerator pedal. The speed signal, however, is preferably produced by a pulse transducer either from the speedometer or a separate pulse transducer.

When conducting tests to show the effectiveness of this preferred form of the present invention an additional input of a digital signal from braking was required to indicate when the vehicle's brakes were being applied. This input was needed to determine if the device was predicting a valid stop or where a false alarm was generated. Tests conducted with the preferred form of the present invention showed a warning time advantage at 120 kpm of 26 to 30 feet over a system where a warning is given by the brake light. Tests additionally show that by use of the proposed sensor which is to detect a rate of change of pressure on the accelerator pedal rather than accelerator pedal movement translates to a warning advantage of typically about 0.04 seconds and this translates to about 18 to 23% of that total early warning time. Thus the present invention provides in its preferred form at the very least an advantage of 18 to 23% advance warning over the prior art forms previously referred to but without any corresponding increase in false alarms.

Because the sensor is a rate sensor it easily detects "panic stops" in which the foot moves more rapidly than normal. However, in trying to extend the raw sensor signal to cover "normal" braking situations, it was found that it is often not possible to distinguish between such situations and other pedal movement such as gear changing hence the need for a "filtering" of the raw sensor signal so as to provide a means whereby signals beyond those purely of a "panic stop" could be used where it was highly likely they were connected with actual braking or the intention to brake.

The proposed filtering algorithm requires only one other vehicle input (in addition to the sensor) and by analysing immediate past data in a number of ways it is able to distinguish between actual braking signals and other sensor output.

Algorithm in accordance with the present invention over tests conducted at motorway speed analysed positives giving rise to a valid early warning, positives when a brake signal was not applied within say 300 milliseconds and false negatives, ie. the brake applied but no early warning given from the algorithm filtered sensor input.

The results achieved with the filtering algorithm and the layout as depicted in FIG. 2 showed a 97% success rate in distinguishing between braking and other signals over a period of motorway driving with a manual gear change motor vehicle.

The filter algorithm operates as follows:

Sensor foot pressure signal 1A is compared in 3A against a preset panic threshold and if lower than panic threshold sends a signal to directly activate the braking signal 9A.

If signal is greater (less negative) than panic threshold signal is further evaluated in 4A. If signal is greater than sensor lower threshold signal is ignored. If signal is less than sensor lower threshold, signal is further evaluated in 5A.

If speed signal 2A is less than minimum speed threshold, signal is ignored. If speed signal 2A is greater than minimum speed threshold, signal is further evaluated in 6A.

If acceleration signal (calculated from the speed signal over a defined previous period) is greater than acceleration threshold, signal is ignored. If acceleration signal is less than acceleration threshold, signal is further evaluated in 7A.

If sensor positive peak (calculated over a defined previous period) is greater than sensor positive peak threshold, signal is ignored. If sensor positive peak is less than sensor positive peak threshold, a signal is sent to activate the braking signal 9A.

Advantages arising from the preferred form of the present invention are as follows:

It will be appreciated by those skilled in the art to which the invention relates that the algorithm may conduct additional evaluation. This evaluation may comprise additional conditions used to determine whether a signal is sent to activate the braking signal 9A or may include conditions under which the activation of the braking signal 9A does not occur. This additional evaluation may utilise the input available to the algorithm as heretobefore described or may utilise inputs in addition to those available to the algorithm as heretobefore described. Possible examples of the additional evaluation which are envisaged are operator adjustable sensitivity inputs, for example, to enable the operator to adjust sensitivity for highway or around town driving or to enable the operator to adjust the sensitivity of the algorithm given weather and/or road conditions.

1. Gives advanced pre-warning of a driver's intention to stop; an example of this as denoted by 31 in FIG. 6. In the example shown in FIG. 6 the advanced warning provided is approximately 0.24 seconds which translates into a distance travelled of 6.6 metres when travelling at 100 km's per hour and approximately 8 metres when travelling at 120 km's per hour.

2. Filter algorithm with speed and sensor inputs used to eliminate gear change and other "false" signals;

3. Sensor mounted on top of the accelerator pedal beneath the driver's foot;

4. Piezoelectric sensor directly gives output signals proportional to rate of change of pressure on the accelerator pedal;

5. System correctly pre-detects virtually all braking operations other than the very gentle, not just panic stop situations;

6. System is self adjusting using recorded values of actual correct activations vs. false or missed activations and thereby maintains maximum sensitivity for any driver style.

7. Can be incorporated into accelerator pedal with little or no changes to physical dimensions;

8. No physical movement of accelerator pedal or removal of foot off pedal is required to activate sensor:

9. Option of using both increasing and reducing accelerator pressures to calculate a measure of driver efficiency, related to fuel consumption;

10. Device is reset after an adjustable time period if activation was not followed by an actual brake application; and 11. Device has potential to give superior advanced warning of driver braking intentions over other concepts since:

a) increased sensitivity of sensor over mechanical, inertial or electrical switch systems;

b) sensor detects before any perceptible physical movement of the accelerator pedal;

c) device does not require actual removal of the foot from the pedal to decide if a "true" braking is imminent, as opposed to a gear change, etc; and d) device is not restricted to only very sudden foot movements as in a panic stop situation.

Although apparatus as described or according to the method may be fitted to new vehicles, the relatively self contained nature of the apparatus may allow economical fitting of the apparatus to existing vehicles.

I claim:

1. A method of operating a warning signal indicative or reasonably indicative of a vehicle about to be braked or severely decelerated, said method comprising:

(I) generating an electrical signal indicative of a rate of change in the pressure or force (hereafter "foot pressure signal") being applied to the accelerator of the vehicle;

(II) generating an electrical signal indicative of the speed of the vehicle (hereafter "speed signal");

(III) comparing, in a monitoring circuit receiving said foot pressure signal, negative values (ie. those of a rate of decrease of pressure) of said foot pressure signal against a threshold level to provide a determination of whether or not there is likely to be a panic stop or not;

(IV) if the comparison of step (III) provides no determination of there being a likely panic stop, in a circuit receiving said foot pressure signal and said speed signal, (a) comparing negative values of foot pressure signal against an alternative threshold level to provide a determination of whether severe braking is likely to occur (but less severe as to be indicative of a panic stop)

and (b) optionally, determining the vehicle is travelling in excess of a speed threshold and (c) optionally, determining immediately preceding values of acceleration of the vehicle (determined over a preceding period) are below a threshold for such values as would indicate that negative foot pressure signals are likely the result of foot movement associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and (V) providing at least for a brief period of time an electrical current actuation of said warning signal whenever there is either:

(a) determination by step (III) of there likely being a panic stop or (b) there is a determination by step (IV) by satisfying condition (a) and any one or more of optional conditions (b), (c) and (d) of there likely being severe braking (but less severe as to be indicative of a panic stop).

2. The method as claimed in claim 1 wherein step (IV) includes step (c) and there is a (IV)(c) determination that does not reject a step (IV) actuation on account of a likely gear change prior to said electrical current actuation of said warning signal.

3. The method of claim 1 wherein there is a (IV)(b) determination of vehicle speed being over a speed threshold prior to there being said electrical current actuation of said warning signal.

4. The method of claim 1 wherein step (IV) includes step (d) and there is a determination by (IV)(d) that does not reject a step (IV) actuation on account of bounce prior to said electrical current actuation of said warning signal.

5. The method of claim 2 wherein the circuit of step (IV) is associated with or includes logic means and the threshold for such values of negative foot pressure signals and/or acceleration threshold is changed by the logic means dependent at least to some extent on inputs thereinto of instances where the existing (IV)(c) threshold has not rejected severe braking but no braking using the brake pedal subsequently ensued related to the severe braking, and vice versa, such changing of the threshold being to better recognise the driving (eg. gear changing) habits of a current driver.

6. The method of claim 1 wherein said generating an electrical signal of step (I) is by means of a piezoelectric transducer which provides an analogue signal function.

7. The method of claim 1 wherein the provision by step (V) of an electrical current actuation of said warning signal is timer controlled, ie. if some alternative or parallel electrical current actuation is not provided within said at least brief period of time, it does not continue after said at least brief period of time to provide any electrical current actuation of said warning signal.

8. The method as claimed in claim 1 wherein said providing at least for a brief period of time an electrical current actuation of said warning signal is in parallel to any electrical current actuation of a said warning signal by a brake actuated switch.

9. The method as claimed in claim 1 wherein said warning signal is at least one brake light.

10. Apparatus for performing a method of operating a warning signal indicative or reasonably indicative of a vehicle about to be braked or severely decelerated, said method comprising:

(I) generating an electrical signal indicative of a rate of change in the pressure or force (hereafter "foot pressure signal") being applied to the accelerator of the vehicle;

(II) generating an electrical signal indicative of the speed of the vehicle (hereafter "speed signal");

(III) comparing, in a monitoring circuit receiving said foot pressure signal, negative values (ie. those of a rate of decrease of pressure) of said foot pressure signal against a threshold level to provide a determination of whether or not there is likely to be a panic stop or not;

(IV) if the comparison of step (III) provides no determination of there being a likely panic stop, in a circuit receiving said foot pressure signal and said speed signal, (a) comparing negative values of foot pressure signal against an alternative threshold level to provide a determination of whether severe braking is likely to occur (but less severe as to be indicative of a panic stop)

and (b) optionally, determining the vehicle is travelling in excess of a speed threshold and (c) optionally, determining immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and (V) providing at least for a brief period of time an electrical current actuation of said warning signal whenever there is either:

(a) determination by step (III) of there likely being a panic stop or (b) there is a determination by step (IV) by satisfying condition (a) and any one or more of optional conditions (b), (c) and (d) of there likely being severe braking (but less severe as to be indicative of a panic stop), said apparatus comprising:

(i) means to generate an electrical signal indicative of the rate of change in the pressure or force (hereafter "foot pressure signal") being applied to the accelerator of the vehicle;

(ii) means to provide an electrical signal indicative of the speed of the vehicle (hereafter "speed signal");

(iii) means to provide a monitoring circuit to receive said foot pressure signal and to compare negative values (ie. those of a rate of decrease of pressure) of said foot pressure signal against a threshold level to provide a determination of whether or not there is likely to be a panic stop or not;

(iv) means to receive said foot pressure signals and said speed signals at least if the comparison of step (III) of the method provides no determination of there being a likely panic stop; and (a) to compare negative values of foot pressure signal against an alternative threshold level to provide a determination of whether severe braking is likely to occur (but less severe as to be indicative of a panic stop); and (b) optionally to determine the vehicle as travelling in excess of a speed threshold: and (c) optionally to determine immediately preceding values of acceleration of the vehicle (determined over a period) are below a threshold for such values as would indicate that negative foot pressure signals are likely the result of foot movements associated with a gear change; and (d) optionally to determine immediately preceding values of positive foot pressure signals (determined over a preceding period—whether the same or different to that of (IV)(c)) are below a threshold for such signals as would indicate that negative foot pressure signals are likely bounce-induced as a result of such immediately preceding positive foot pressure signals; and (v) means providing at least for a brief period of time an electrical current actuation of a warning signal whenever there is either (a) determination by step (III) of the method that there is likely being a panic stop or (b) there is a determination by step (IV) of the method by satisfying condition (a) and at least one or more of the optional conditions (b), (c) and (d) of the method of there likely being severe braking (but less severe as to be indicative of a brake panic stop).

11. Apparatus as claimed in claim 10 wherein said means to receive said foot pressure signals and said speed signals at least if the comparison of step (III) of the method provides no determination of there being a likely panic stop includes means whereby the determination of step (III)(c) is included in said means such that a (IV)(c) determination that does not reject a step (IV) actuation on account of a likely gear change prior to said electrical current actuation of said warning signal can be performed.

12. Apparatus of claim 10 wherein said means to receive said foot pressure signals and said speed signals at least if the comparison of step (III) of the method provides no determination of there being a likely panic stop includes means whereby there is a (IV)(b) determination of vehicle speed being over a speed threshold prior to there being said electrical current actuation of said warning signal.

13. Apparatus as claimed in claim 10 wherein said means to receive said foot pressure signals and said speed signals at least if the comparison of step (III) of the method provides no determination of there being a likely panic stop includes means in the circuit thereof whereby logic means controls the threshold for negative foot pressure signals, whereby the threshold for such values is changed by the logic means dependent at least to some extent on inputs thereinto of instances where the existing (IV)(c) threshold has not rejected severe braking but no braking using the brake pedal subsequently ensued related to the severe braking determination by step (IV)(c), and vice versa (such changing of the threshold being to better recognise the driving (eg. gear changing) habits of a current driver.

14. Apparatus of claim 10 wherein said generating an electrical signal of step (I) is by means of a piezoelectric transducer which provides an analogue signal to the monitoring circuits(s).

15. Apparatus of claim 10 wherein the provision by step (V) of an electrical current actuation of said warning signal is timer controlled, ie. if some alternative or parallel electrical current actuation is not provided within said at least brief period of time, it does not continue after said at least brief period of time to provide any electrical current actuation of said warning signal.

16. Apparatus as claimed in claim 10 when operatively installed in motor vehicle and the warning signal device is a brake light or lights to be operated in addition to or in parallel to normal brake light signals of the motor vehicle.

17. A method of operating a warning signal indicative or reasonably indicative of a vehicle about to be braked or severely decelerated, said method comprising:

(i) generating with a piezoelectric transducer an electrical signal indicative of a rate of change in the pressure or force (hereafter "foot pressure signal") being applied to the accelerator of the vehicle;

(ii) optionally generating an electrical signal indicative of the speed of the vehicle (hereafter "speed signal");

(iii) (a) comparing, in a monitoring circuit receiving said foot pressure signal, negative values (ie. those of a rate of decrease of pressure) of said foot pressure signal against a threshold level to provide a determination of whether or not there is likely to be a panic stop or not;

(b) optionally comparing in a monitoring circuit receiving said speed signal, values of said speed signal to determine whether said vehicle is travelling in excess of a speed threshold;

(iv) if the comparison is step (iii) provides a determination of there being a likely panic stop providing at least for a brief period of time an electrical current actuation of said warning signal.

18. The method as claimed in claim 17 wherein said provision at least for a brief period of time of an electrical current actuation of said warning signal is to a brake light and is in parallel to the existing brake pedal actuation thereof.

19. The method as claimed in claim 17 wherein:

(iv) if the comparison of step (iii) provides no determination of there being a likely panic stop, in a circuit receiving said foot pressure signal and said speed signal, (a) comparing negative values of foot pressure signal against an alternative threshold level to provide a determination of whether severe braking is likely to occur (but less severe as to be indicative of a panic stop), and (b) optionally, determining the vehicle is travelling in excess of a speed threshold and (c) optionally, determining immediately preceding values of acceleration of the vehicle (determined over a preceding period) are below a threshold for such values as would indicate that negative foot pressure signals are likely the result of foot movements associated with a gear change and (d) optionally, determining immediately preceding values of positive foot pressure signals (determined over a preceding period) are below a threshold for such signals as would indicate that negative foot pressure signals are likely bounce-induced as the result of such immediately preceding positive foot pressure signals, and wherein even where there is no determination of step (iii) of there likely being a panic stop, providing at least for a brief period of time an electrical current actuation of said warning signal whenever there is a determination by step (iv) by satisfying condition (a) and any one or more of optional conditions (b), (c) and (d) of there likely being severe braking (but less severe as to be indicative of a panic stop).

20. The method of claim 19 wherein said provision of the electrical current actuation of step (iv) is in parallel to that which would be provided to the warning signal by a conventional brake pedal (eg. to the brake lights).

21. Apparatus for performing a method of operating a warning signal indicative or reasonably indicative of a vehicle about to be braked or severely decelerated, said method comprising:

(i) generating with a piezoelectric transducer an electrical signal indicative of a rate of change in the pressure or force (hereafter "foot pressure signal") being applied to the accelerator of the vehicle;

(ii) generating an electrical signal indicative of the speed of the vehicle (hereafter "speed signal");

(iii) comparing, in a monitoring circuit receiving said foot pressure signal, negative values (ie. those of a rate of decrease of pressure) of said foot pressure signal against a threshold level to provide a determination of whether or not there is likely to be a panic stop or not;

(iv) if the comparison of step (iii) provides a determination of there being a likely panic stop providing at least for a brief period of time an electrical current actuation of said warning signal, said apparatus comprising:

(i) means for generating with a piezoelectric transducer an electrical signal indicative of the range of change in the pressure or force (hereafter "foot pressure signal") being applied to the accelerator of the vehicle;

(ii) means for generating an electrical signal indicative of the speed of the vehicle (hereafter "speed signal");

(iii) means for comparing, in a monitoring circuit receiving said foot pressure signal, negative values (ie. those of a rate of decrease of pressure) of said foot pressure signal against a threshold level to provide a determination of whether or not there is likely to be a panic stop or not;

(iv) means which if the comparison in the monitoring circuit provides a determination of there being a likely panic stop providing at least for a brief period of time an electrical current actuation of said warning device.

22. Apparatus as claimed in claim 21 wherein means is provided for performing the following extension of the method, namely:

(iv) if the comparison of step (iii) provides no determination of there being a likely panic stop, in a circuit receiving said foot pressure signal and said speed signal, (a) comparing negative values of foot pressure signal against an alternative threshold level to provide a determination of whether severe braking is likely to occur (but less severe as to be indicative of a panic stop), and (b) optionally, determining the vehicle is travelling in excess of a speed threshold and (c) optionally, determining immediately preceding values of acceleration of the vehicle (determined over a preceding period) are below a threshold for such values as would indicate that negative foot pressure signals are likely the result of foot movements associated with a gear change and (d) optionally, determimng immediately preceding values of positive foot pressure signals (determined over a preceding period) are below a threshold for such signals as would indicate that negative foot pressure signals are likely bounce induced as the result of such immediately preceding positive foot pressure signals, and wherein even where there is no determination of step (iii) of there likely being a panic stop, providing at least for a brief period of time an electrical current actuation of said warning signal whenever there is a determination by step (iv) by satisfying condition (a) and any one or more of optional conditions (b), (c) and (d) of there likely being severe braking (but less severe as to be indicative of a panic stop), the apparatus being further characterised in that it provides means in or associated with said monitoring circuit for performing said method.

* * * * *